(12) United States Patent
Urieli et al.

(10) Patent No.: US 12,535,784 B1
(45) Date of Patent: Jan. 27, 2026

(54) VEHICLE CONTROL SYSTEMS INCLUDING NEURAL NETWORK CONTROL POLICIES WITH NON-LINEAR H-INFINITY ROBUSTNESS

(71) Applicant: GM GLOBAL TECHNOLOGY OPERATIONS LLC, Detroit, MI (US)

(72) Inventors: Daniel Urieli, Herzliya (IL); Alon Capua, Hulda (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/781,288

(22) Filed: Jul. 23, 2024

(51) Int. Cl.
| | |
|---|---|
| *G05B 13/02* | (2006.01) |
| *B60W 10/04* | (2006.01) |
| *B60W 10/18* | (2012.01) |
| *B60W 10/20* | (2006.01) |
| *B60W 10/26* | (2006.01) |
| *B60W 50/00* | (2006.01) |
| *B60W 60/00* | (2020.01) |
| *G06N 3/092* | (2023.01) |

(52) U.S. Cl.
CPC ........... *G05B 13/027* (2013.01); *B60W 10/04* (2013.01); *B60W 10/18* (2013.01); *B60W 10/20* (2013.01); *B60W 10/26* (2013.01); *B60W 50/00* (2013.01); *B60W 60/001* (2020.02); *G06N 3/092* (2023.01); *B60W 2710/18* (2013.01); *B60W 2710/207* (2013.01); *B60W 2710/244* (2013.01); *B60W 2720/106* (2013.01)

(58) Field of Classification Search
CPC ..... G05B 13/027; B60W 10/04; B60W 10/18; B60W 10/20; B60W 10/26; B60W 50/00; B60W 60/001; B60W 2710/18; B60W 2710/207; B60W 2710/244; B60W 2720/106; G06N 3/092
See application file for complete search history.

(56) References Cited

U.S. PATENT DOCUMENTS

| | | | | |
|---|---|---|---|---|
| 11,260,849 | B2* | 3/2022 | Zhu | G05D 1/0255 |
| 11,654,933 | B2* | 5/2023 | Hwu | G06N 3/092 |
| | | | | 701/27 |
| 2004/0162644 | A1* | 8/2004 | Torii | G06N 3/0442 |
| | | | | 701/1 |
| 2018/0089563 | A1* | 3/2018 | Redding | G06N 3/0464 |
| 2019/0266489 | A1* | 8/2019 | Hu | B60W 10/20 |
| 2020/0142421 | A1* | 5/2020 | Palanisamy | G06N 3/084 |

(Continued)

FOREIGN PATENT DOCUMENTS

| | | | | |
|---|---|---|---|---|
| DE | 102019111414 | A1 * | 11/2019 | B60W 50/08 |
| EP | 3865365 | A1 * | 8/2021 | G01C 21/3889 |

*Primary Examiner* — Babar Sarwar (57) ABSTRACT

An example method of generating a neural network control policy for a vehicle includes obtaining a performance objective parameter associated with a control system of a vehicle, obtaining a policy optimizing algorithm corresponding to the performance objective parameter, defining a system state space, a control action space, and a disturbance space, each associated with the control system, generating a neural network control policy, based on the system state space, the control action space, and the disturbance space, wherein the neural network control policy has a non-linear H-infinity robustness guarantee, and automatically controlling at least one vehicle component according to the neural network control policy.

20 Claims, 8 Drawing Sheets

(56) References Cited

U.S. PATENT DOCUMENTS

| | | | |
|---|---|---|---|
| 2020/0172116 A1* | 6/2020 | Zhu | B60W 40/1005 |
| 2020/0310421 A1* | 10/2020 | Kwon | B60W 50/00 |
| 2020/0388164 A1* | 12/2020 | Domprobst | G05D 1/0297 |
| 2021/0233196 A1* | 7/2021 | Qin | G06Q 30/02 |
| 2021/0276587 A1* | 9/2021 | Urtasun | G06F 11/3013 |
| 2021/0303732 A1* | 9/2021 | Hutmacher | G06N 3/0475 |
| 2022/0083056 A1* | 3/2022 | Moran | B60W 40/08 |
| 2022/0315018 A1* | 10/2022 | Miyake | B60W 50/0098 |
| 2022/0363259 A1* | 11/2022 | Shi | G06N 3/092 |
| 2023/0041501 A1* | 2/2023 | Weiss | G06V 20/00 |
| 2023/0058169 A1* | 2/2023 | Cella | G06N 3/08 |
| 2023/0073027 A1* | 3/2023 | Zieglmeier | B60W 50/029 |
| 2023/0186076 A1* | 6/2023 | Noh | G06N 3/047 706/15 |
| 2024/0083428 A1* | 3/2024 | Yu | B60W 30/12 |
| 2025/0111241 A1* | 4/2025 | Drakulic | G06N 3/006 |
| 2025/0128711 A1* | 4/2025 | Moore | B60W 30/165 |

\* cited by examiner

VEHICLE CONTROL SYSTEMS INCLUDING NEURAL NETWORK CONTROL POLICIES WITH NON-LINEAR H-INFINITY ROBUSTNESS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to vehicle control systems including neural network control policies with non-linear H-infinity robustness.

Vehicles use automated control systems to control various components of the vehicle. Robust control methods ensure system stability under disturbances, but fall short in performance when applied to non-linear systems. Neural-network based control methods trained using deep reinforcement learning (RL) have high performance on many challenging non-linear tasks, but lack robustness guarantees.

SUMMARY

An example method of generating a neural network control policy for a vehicle includes obtaining a performance objective parameter associated with a control system of a vehicle, obtaining a policy optimizing algorithm corresponding to the performance objective parameter, defining a system state space, a control action space, and a disturbance space, each associated with the control system, generating a neural network control policy, based on the system state space, the control action space, and the disturbance space, wherein the neural network control policy has a non-linear H-infinity robustness guarantee, and automatically controlling at least one vehicle component according to the neural network control policy.

In some examples, the at least one vehicle component includes a steering mechanism, an accelerator, a braking mechanism, a drive unit or a vehicle battery charging system.

In some examples, automatically controlling the at least one vehicle component includes controlling a steering angle of the vehicle, controlling an acceleration of the vehicle, controlling braking of the vehicle, controlling power output by the drive unit, or controlling charging of a vehicle battery.

In some examples, generating the neural network control policy includes modeling nonlinear dynamics of the system state space, the control action space, and the disturbance space, using one or more polynomial equations.

In some examples, the method includes executing an implementation of the control system of the vehicle or a simulation of the control system of the vehicle, and generating the one or more polynomial equations based on data gathered during execution of the control system or a simulation of the control system, wherein the data is indicative of nonlinear dynamics of the control system.

In some examples, generating the neural network control policy includes solving a Hamilton Jacobi Inequality according to the one or more polynomial equations. In some examples, solving the Hamilton Jacobi inequality includes solving a state dependent linear matrix inequality (SDLMI) using a sum-of-squares solver.

In some examples, the method includes projecting an output of a neural network of the neural network control policy onto a defined set of allowable robust actions.

In some examples, the method includes constructing the set of allowable robust actions by adding differential layers to the neural network, to augment the neural network.

In some examples, the method includes training the neural network control policy using a policy optimizing algorithm. In some examples, the policy optimizing algorithm includes at least one of reinforcement learning or model-based planning.

In some examples, the policy optimizing algorithm includes at least one of proximal policy optimization (PPO), a deep deterministic policy gradient (DDPG), a twin delayed deep deterministic policy gradient (TD3), or a soft actor-critic (SAC).

In some examples, generating the neural network control policy includes generating a first candidate neural network control policy using a first value for a tunable robustness parameter, generating a second candidate neural network policy using a second value for a tunable robustness parameter, wherein the first value is different than the second value, comparing a robustness output of the first candidate neural network control policy with a robustness output of the second candidate neural network policy, and selecting the first candidate neural network control policy or the second candidate neural network policy according to comparing the robustness output of each candidate neural network control policy.

An example method of generating a neural network control policy includes obtaining a performance objective parameter associated with a control system of a device, obtaining a policy optimizing algorithm corresponding to the performance objective parameter, defining a system state space, a control action space, and a disturbance space, each associated with the control system, generating a first candidate neural network control policy based on the system state space, a control action space, and a disturbance space, using a first value for a tunable robustness parameter, generating a second candidate neural network control policy based on the system state space, a control action space, and a disturbance space, using a second value for the tunable robustness parameter, wherein the first value is different than the second value, comparing a robustness output of the first candidate neural network control policy with a robustness output of the second candidate neural network control policy, selecting the first candidate neural network control policy or the second candidate neural network control policy according to comparing the robustness output of each candidate neural network control policy, wherein the selected one of the first candidate neural network policy or the second candidate neural network control policy has a non-linear H-infinity robustness guarantee, and automatically controlling the device according to the selected one of the first candidate neural network policy or the second candidate neural network control policy.

In some examples, the device includes a steering mechanism of a vehicle, an accelerator of the vehicle, a braking mechanism of the vehicle, a drive unit of the vehicle or a vehicle battery charging system of the vehicle.

In some examples, automatically controlling the device includes controlling a steering angle of the vehicle, controlling an acceleration of the vehicle, controlling braking of the vehicle, controlling power output by the drive unit, or controlling charging of a vehicle battery. In some examples, the device includes at least one of a power microgrid or a rotor of an aerial device.

An example controller configured to implement a neural network control policy for a system includes memory configured to store computer-executable instructions and a neural network control policy, and at least one processor configured to receive an input, provide a projection from the neural network control policy onto a robust action set, wherein the neural network control policy has a non-linear H-infinity robustness guarantee, and automatically control a component associated with the system according to the neural network control policy and the robust action set, wherein the system includes at least one of a vehicle control system, an aerial device control system, and a power grid control system.

In some examples, the neural network control policy is generated by solving a state dependent linear matrix inequality (SDLMI) using a sum-of-squares solver.

In some examples, the neural network control policy includes a set of tuned neural-network weights, based on training the neural network control policy according to a performance objective parameter associated with a control system, and a policy optimizing algorithm corresponding to the performance objective parameter.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Robust control methods ensure system stability under disturbances, but fall short in performance when applied to non-linear systems. Neural-network based control methods trained using deep reinforcement learning (RL) have high performance on many challenging non-linear tasks, but lack robustness guarantees. Described herein are example systems and methods for enforcing robust control guarantees within neural network policies, improving average-case performance over existing robust control methods and worst-case stability over deep RL methods.

While some prior models assume linear time-invariant dynamics, which can restrict the allowable actions and reduce the flexibility of neural network policies in handling non-linear dynamics, example embodiments described in the present application include neural network control policies with non-linear H-infinity robustness guarantees. For example, neural network control policies with non-linear H-infinity robustness guarantees may be constructed and trained according to example embodiments described herein, and a tunable robustness parameter facilitates trading off robustness and average performance, which is an important feature for real-world deployments. Some example embodiments facilitate the application of robust control principles to a wider range of non-linear systems, improving both the robustness and performance of neural network policies in real-world applications.

In some examples, robustness guarantees are used which take into account the non-linear aspects of a system, for better performance. Non-linear H-infinity robustness generates a larger set of allowable actions, and therefore more freedom for the neural network, without comprising on robustness of the control system.

As mentioned above, robust controllers ensure stability under disturbances, but are too simplistic to handle systems with non-linear dynamics. Non-linear neural network (NN) controllers achieve high performance in tasks with non-linear dynamics but lack robustness guarantees. Enforcing linear robustness guarantees in neural network controllers may be overly restrictive, and may reduce the flexibility of neural networks to handle non-linear dynamics. For real-world deployments it is important to be able to tune a trade-off between robustness and performance.

A tunable robustness parameter may be implemented by solving a matrix inequality, as discussed further below. For example, by setting a gamma parameter of the system higher or lower, a balance between robustness and performance of the control system may be tuned. In some examples, a lower gamma parameter value enforces greater robustness, while a higher gamma parameter allows more control system performance at the expense of robustness.

Some example embodiments apply the control outputs with non-linear H-infinity robustness guarantees to vehicle control systems, such as automated steering, automated acceleration and braking, automated charging and discharging of a vehicle battery, etc. In other example embodiments, the control outputs with non-linear H-infinity robustness guarantees may be applied to other control systems such as power control in microgrids, control of missile trajectories, control of automated aerial devices such as drones, etc.

Figure 1:
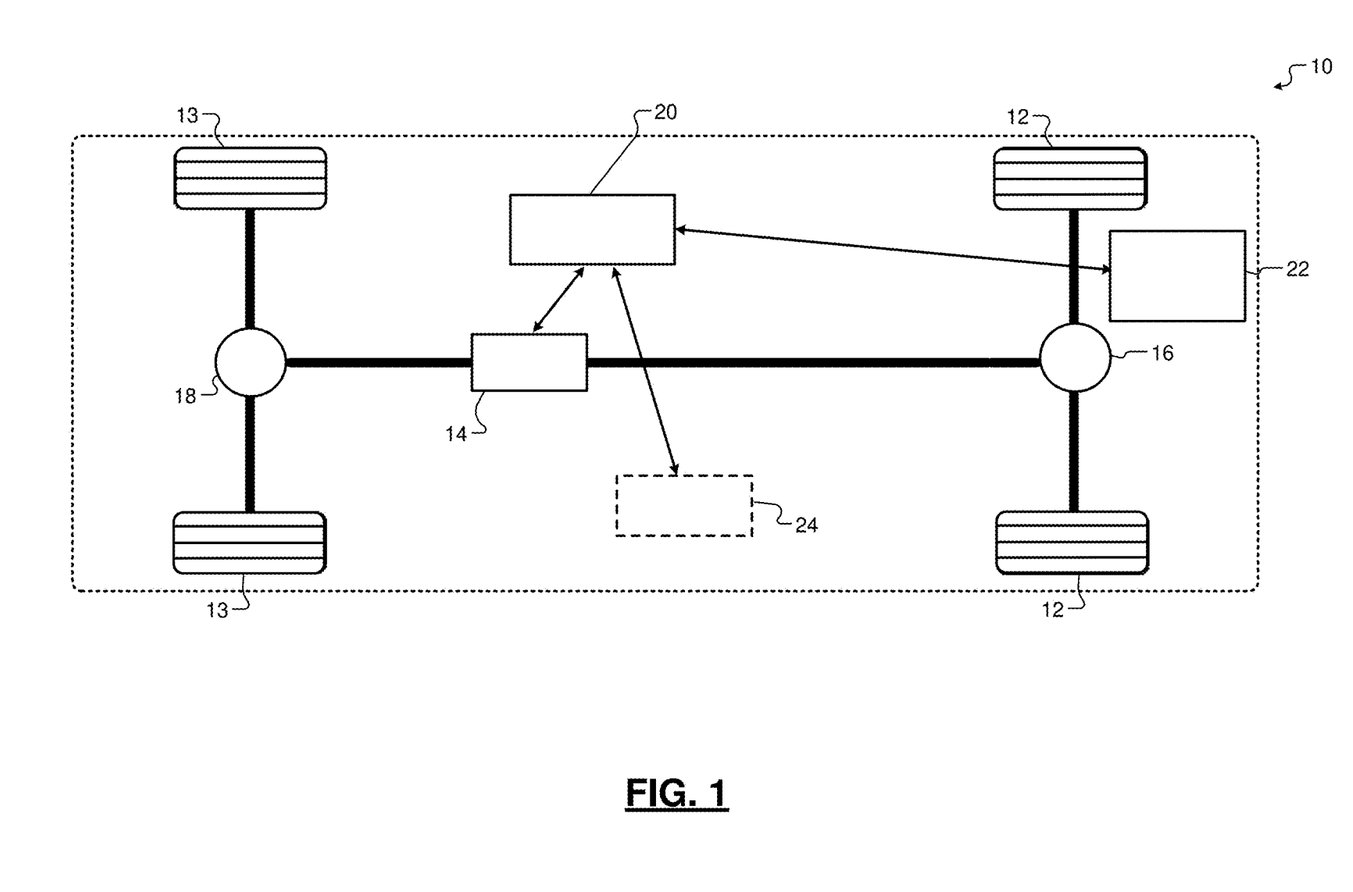
FIG. 1 is a functional block diagram of an example embodiment of a vehicle control system including a neural network control policy with non-linear H-infinity robustness.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an acceleration paddle, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, including one or more vehicle sensors (such as lidars, cameras, microphones, pressure sensors, wheel position sensors, location sensors such as global positioning system (GPS) antennas, etc.). Some sensors may be configured to monitor current motion of the vehicle, acceleration of the vehicle, steering torque, etc.

As shown in FIG. 1, the vehicle 10 includes a front vehicle camera 24 and an optional side vehicle camera 26. In various implementations, the vehicle 10 may include more or less of any one of these vehicle cameras (such as a rear vehicle camera, etc.). Each vehicle camera may include any suitable camera, laser, lidar sensor, etc., which is used to capture images around the vehicle 10 (such as a front vehicle camera image depicting a scene in front of the vehicle, etc.). In some example embodiments, a vehicle object detector may be configured to detect a closest in-path vehicle (CIPV) (e.g., another vehicle in front of a current driving path of the vehicle 10), a vulnerable road user (VRU) (e.g., a pedestrian or cyclist), etc.

The vehicle control module 20 may execute a neural network control policy with non-linear H-infinity robustness. For example, the vehicle control module 20 may be configured to obtain input parameters from one or more vehicle sensors, and output a control signal for one or more vehicle components with non-linear H-infinity robustness guarantees. Example vehicle components include, but are not limited to, automated vehicle steering, automated vehicle acceleration and braking, automated charging and discharging of a vehicle battery, etc.

Although FIG. 1 illustrates an example vehicle implementation, other example embodiments may implement a neural network control policy with non-linear H-infinity robustness guarantees in other suitable environments, such as microgrid power control, missile guidance and control, flight control for drones or other automated aerial devices, etc.

Referring again to FIG. 1, the vehicle control module 20 may communicate with another device via a wireless communication interface, which may include one or more wireless antennas for transmitting and/or receiving wireless communication signals. For example, the wireless communication interface may communicate via any suitable wireless communication protocols, including but not limited to vehicle-to-everything (V2X) communication, Wi-Fi communication, wireless area network (WAN) communication, cellular communication, personal area network (PAN) communication, short-range wireless communication (e.g., Bluetooth), etc. The wireless communication interface may communicate with a remote computing device over one or more wireless and/or wired networks. Regarding the vehicle-to-vehicle (V2X) communication, the vehicle 10 may include one or more V2X transceivers (e.g., V2X signal transmission and/or reception antennas).

Figure 2:
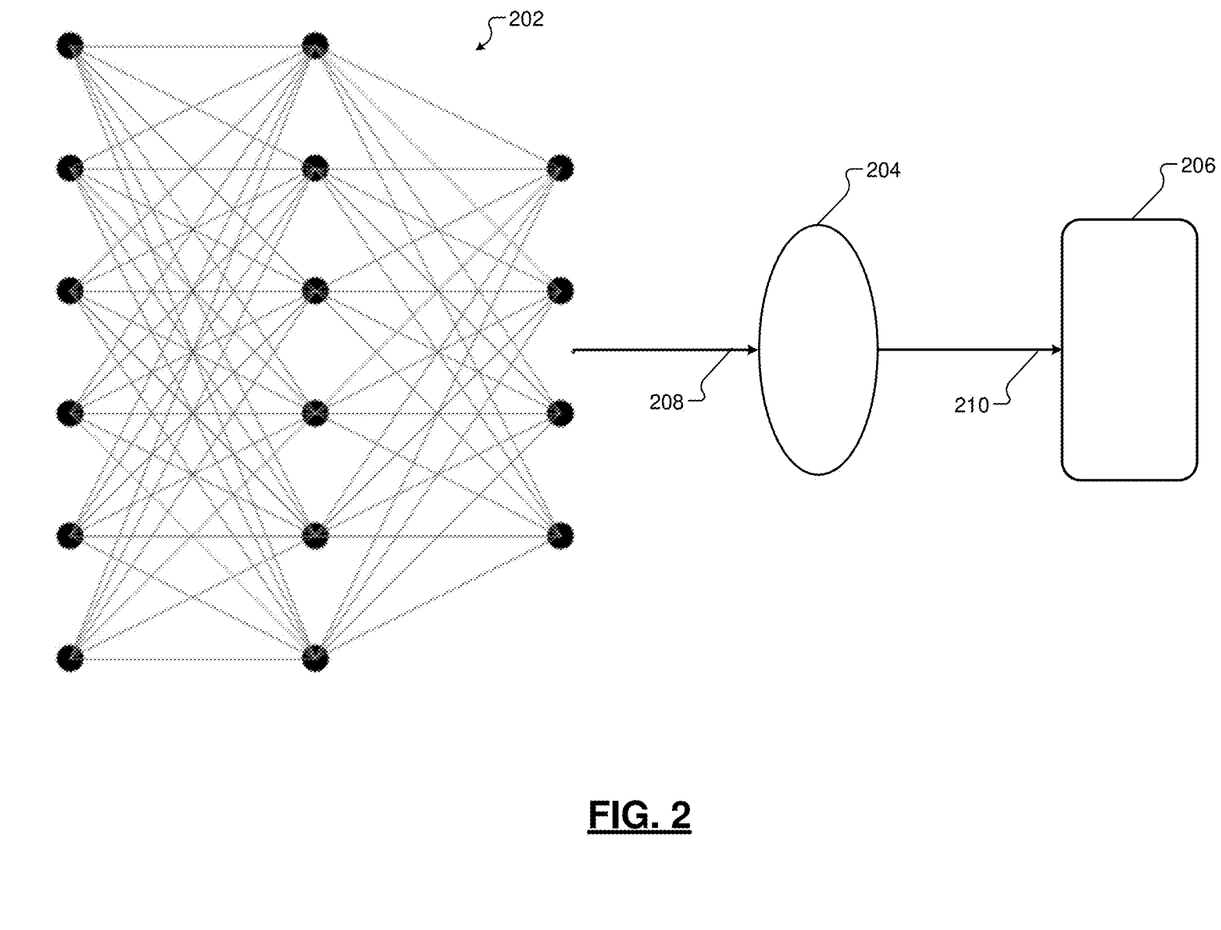
FIG. 2 is a block diagram of an example neural network control policy with non-linear H-infinity robustness.

FIG. 2 is a block diagram of an example neural network control policy with non-linear H-infinity robustness. As shown in FIG. 2, a neural network 202 is trained to provide a projection 208 onto a robust action set 204. The robust action set 204 may be a set of defined, allowable robust actions. In various implementations, the robust action set 204 may be defined based on non-linear H-infinity robustness.

For example, the neural network 202 may output some control action, such as a steering wheel control output, engine power control output, an acceleration pedal control output, a direction for a missile, a power setting for a power system, propeller control signals for a drone, etc. Each output action may be a vector in space, and through projection 208 to the robust action set 204, another robust output vector (e.g., the robust action 210) is generated which is close to the original control action.

For example, the robust action set 204 is configured to output a robust action 210 to control operation of a controlled device 206. Example controlled devices include, but are not limited to, automated driving for a vehicle, automated battery charging and discharging, automated aerial devices such as drones, power in a microgrid, etc.

In some examples, the neural network 202 may be trained using reinforcement learning. Constructing the network may include defining network nodes, connections, and arithmetic operations, where training the network may include adjusting network weights to optimize outputs. Reinforcement learning is one example for training a network. In some examples, data may be collected while the system of interest is acting or being controlled, either as a simulation or in the real world. The collected data may be used to train the neural network 202, while the projection 208 is computed using example processes described herein.

Figure 3:
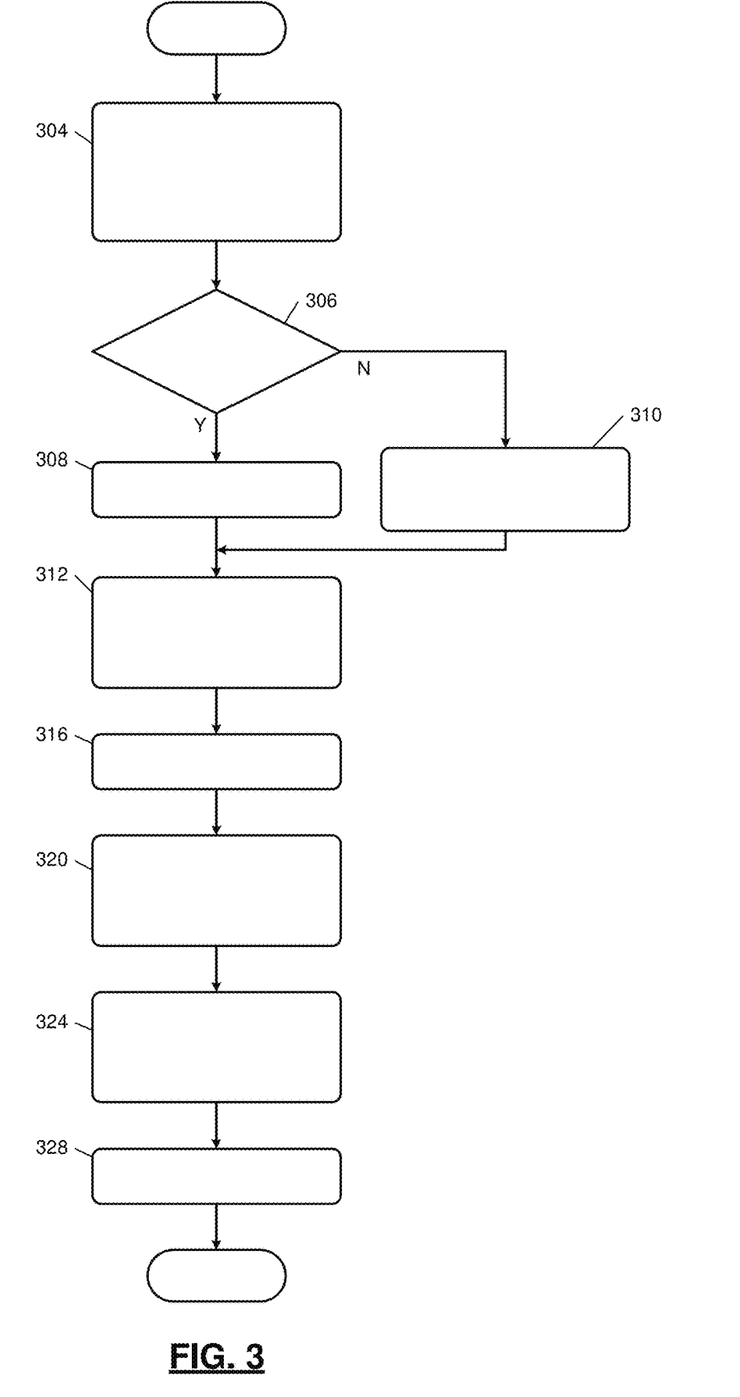
FIG. 3 is a flowchart depicting an example process for training a neural network control policy for non-linear H-infinity robustness.

FIG. 3 is a flowchart depicting an example process for training a neural network control policy for non-linear H-infinity robustness. The process may be performed by, for example, by a desktop computer, laptop computer, cloud computing, etc. In some examples, one or more portions of the process may be performed by the vehicle control module 20 of FIG. 1, such as running the system at 310 to obtain system dynamics or training the policy at 324, using an in-vehicle controller to collect data or train the controller in a vehicle system implementation.

At 304, the method begins by obtaining a performance measure parameter, a tunable robustness parameter, and a policy optimizing algorithm input. For example, a performance measure (e.g., a parameter I) may be a target performance metric to optimize in the control system, such as a target voltage to minimize, a target score for a game, a path-tracking error in autonomous driving, etc. The performance measure may be maximized, minimized, adjusted towards a specified value or maintained within a specified range, etc., depending on the application.

The tunable robustness parameter (e.g., a parameter y) may be used to evaluate the optimized network for various robustness levels. For example, different networks may be optimized at various gamma values from 0.1 up to 1, in 0.1 increments (or other values or increments). The resulting optimized networks may be evaluated for robustness at each gamma value, to determine a desired robustness setting based on gamma.

The policy optimizing algorithm (e.g., a parameter A) may be a reinforcement algorithm in some examples, to update the neural network parameter. Example reinforcement algorithms include, but are not limited to, proximal policy optimization (PPO), deep deterministic policy gradient (DDPG), twin delayed deep deterministic policy gradient (TD3), soft actor-critic (SAC), etc. The algorithm controls how to collect system data, and how to modify network parameters to optimize performance.

At 306, the process determines whether polynomial system dynamics of the system of interest are known (e.g., via a system engineer that knows whether a system model exists or not). If so, the process sets the known polynomial system dynamics at 308. If the polynomial system dynamics are not known at 306, a dedicated control process executes the system to collect data to learn about its dynamics at 310, such as by running the system (e.g., a model of the system), to obtain the polynomial system dynamics (e.g., by gathering data as the system runs or a model of the system is simulated).

For example, if system dynamics are already known, the system dynamics are used for optimization. If the system dynamics need to be learned first, data may be collected to see how the system changes over time, based on control actions and the environment (e.g., wind changes, temperature changes, etc.). An example system dynamics polynomial may be defined as $x = Ax^{\{d\}} + Bu + Gw$, where A, B and G are matrices describing the system dynamics, $x^{\{d\}}$ is a vector of all possible monomials up to degree d, u is a control input, and w is a finite disturbance.

After obtaining the polynomial system dynamics at 308 or 310, the process includes solving a state dependent linear matrix (SDLM) inequality at 312, such as by using a sum-of-squares (SOS) solver, to obtain a matrix P. The process then constructs a set of allowable robust actions at 316, based on the matrix P obtained from solving the SDLM inequality.

At 320, the process constructs a robust policy class by adding differential layers to the neural network, using the matrix P obtained from solving the SDLM inequality. For example, a set of allowable robust actions may be constructed by adding differential layers to the neural network that implement cone projection, to augment the neural network. The process then trains the policy using a policy optimizing algorithm at 324, such as reinforcement learning, model-based planning, etc. At 328, the process outputs a trained neural network.

As described above, the network may be generated by determining features of a system with nonlinear dynamics (such as one or more vehicle control systems), and model the nonlinear system dynamics using polynomial equations (which may include running the system to gather nonlinear dynamic data of the system, prior to modeling the nonlinear system dynamics using polynomial equations).

In some examples, the polynomial dynamics may be modeled as $x = Ax^{\{d\}} + Bu + Gw$, where $x \in R^n$ is a state vector, $x^{\{d\}}$ is a vector of all monomials of degree less than or equal to d, A, B and G are matrices, $u \in R^m$ is a control input, and $w \in R^p$ is a finite disturbance. If the matrices A, B and G are unknown, they may be learned based on data gathered from system execution.

After modeling the nonlinear system dynamics using polynomial equations at the process continues to solve a Hamilton Jacobi inequality (HJI) for the polynomial dynamics. For example, the process continues to solve an H-infinity robust control problem by minimizing the L2 gain γ, such that:

$$\int_0^\infty \|z(t)\|^2 dt \leq \gamma^2 \left( \|x(0)\|^2 + \int_0^\infty \|w(t)\|^2 dt \right), \forall w \in L_2$$

where z(t) is a controlled output, γ is a maximum gain from disturbance to output, x(0) is an initial state, and w(t) is disturbance inputs. Solving the Hamilton Jacobi inequality (HJI) may also include solving the equation:

$$V_x(f(x) + g_2(x)u + g_1(x)w) - \frac{\gamma^2}{2}\|w\|^2 + \frac{1}{2}\|z(x,u)\|^2 \leq 0$$

where $V_x$ is a gradient of Lyapunov function V, f(x) are the system dynamics, $g_1(x)$ and $g_2(x)$ are control matrices, and u is a control input. In order to maximize robustness for a minimal gamma, the left hand side may be minimized under a worse disturbance w*, using an optimal control policy u*. The above equations may be solved efficiently when using polynomial dynamics.

In some examples, solving the Hamilton Jacobi inequality (HJI) may include solving the following matrices:

$$\begin{bmatrix} Y(x)^T B_2(x)^T M(x)^T + M(x)B_2(x)Y(x) + SA(x)^T M(x)^T + M(x)A(x)S & M(x)B_1(x) & Y(x)^T & SC_1(x)^T \\ * & -\gamma^2 I & 0 & 0 \\ * & * & -R_2(x) & 0 \\ * & * & * & -I \end{bmatrix} \leq 0$$

wherein Y(x) and S are matrices to solve for, A(x), $B_1(x)$, $B_2(x)$ and $C_1(x)$ are system matrices, M is a polynomial matrix, and $R_2(x)$ is a cost matrix. For example, the process may find values for the unknown matrices Y(x) and S, such that the matrix is negative semi-definite. For polynomial dynamics, the HJI becomes a state-dependent linear matrix inequality (SDLMI). The SDLMI may be solved efficiently using a sum-of-squares assumption.

The process may then project the neural network outputs onto a robust action set, as a differential neural network layer. For example, a robust action set may be defined as $C_{NL-H_\infty}(x)$. This robust action set may be defined as a set of all actions u that satisfy the following inequality:

$$x^{\{d\}} \left( PM(x)A(x) + A(x)^T M(x)^T P + \frac{2}{\gamma^2} PM(x)B_1(x)B_1(x)^T M(x)^T P + \frac{1}{2}Q \right) +$$
$$(2B_2(x)^T M(x)^T P x^{\{d\}})^T u + \frac{1}{2} u^T R_2(x) u \leq 0$$

Using the SDLMI solution matrix $S^{-1} = P$, and the system's learned dynamics, the set of allowable robust actions may be constructed. This is a convex set, so the projection of a neural network output may be performed efficiently (e.g., as a differential neural network layer).

Figure 4:
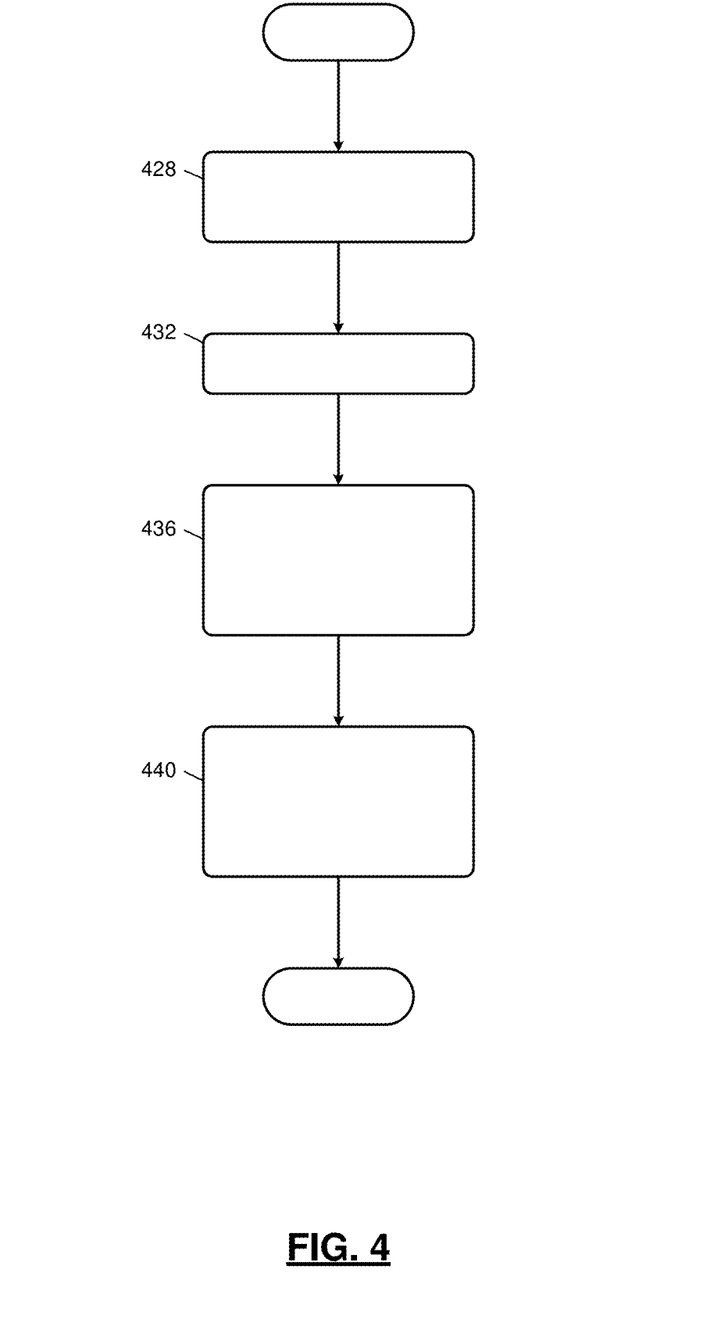
FIG. 4 is a flowchart depicting an example process for controlling a vehicle component using a neural network control policy with non-linear H-infinity robustness.

FIG. 4 is a flowchart depicting an example process controlling a vehicle component using a neural network control policy with non-linear H-infinity robustness. The process may be performed by, for example, the vehicle control module 20 of FIG. 1.

At 428, obtains a network trained for use as a vehicle controller. For example, a network may be trained to perform vehicle control operations, which may include using a policy optimizing algorithm, such as reinforcement learning, model-based planning, etc.

At 432, the process receives a system control input. The process then generates a control output using the trained network at 436, where the control output has non-linear H-infinity robustness guarantees. At 440, a device is controlled based on the control output of the trained network. For example, the control output may control automated driving of a vehicle, automated charging of a vehicle battery or other component, power in a microgrid, flight of an automated aerial device such as a drone, etc.

Figure 5:
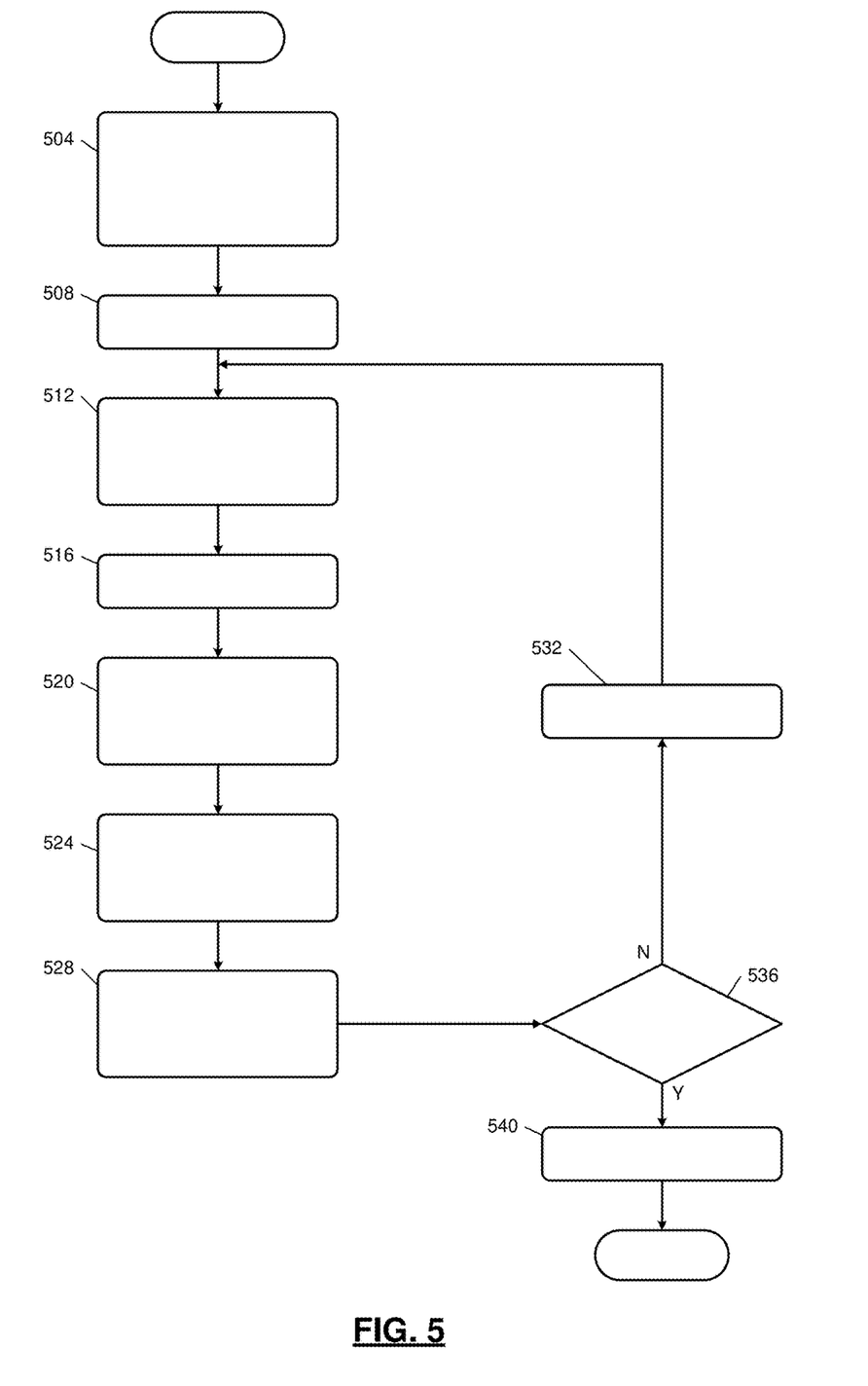
FIG. 5 is flowchart depicting an example process for modifying a tunable robustness parameter.

FIG. 5 is flowchart depicting an example process for modifying a tunable robustness parameter. The process may be performed by, for example, The process may be performed by, for example, by a desktop computer, laptop computer, cloud computing, etc. In some examples, one or more portions of the process may be performed by the vehicle control module 20 of FIG. 1, such as running the system at 508 to obtain system dynamics or training the policy at 524, using an in-vehicle controller to collect data or train the controller in a vehicle system implementation.

At 504, the process begins by obtaining a performance measure parameter, a tunable robustness parameter, and policy optimizing algorithm inputs. At 508, the process defines polynomial system dynamics. The process then solves a state dependent linear matrix (SDLM) inequality using a sum-of-squares solver at 512, and constructs a set of allowable robust actions at 516.

At 520, the process constructs a robust policy class by adding differential layers to the neural network. The process trains the policy using a policy optimizing algorithm at 524, such as reinforcement learning, model-based planning, etc. At 528, the process compares robustness of the optimized policy to a target robustness threshold.

If the robustness of the optimized policy is not within the threshold range at 526, the process modifies the tunable robustness parameter at 532, and returns to 512 to solve the SDLM inequality based on the modified tunable robustness parameter. If the robustness of the optimized policy is within the threshold range at 536, the process proceeds to 540 to return the optimized policy.

Figure 6A:
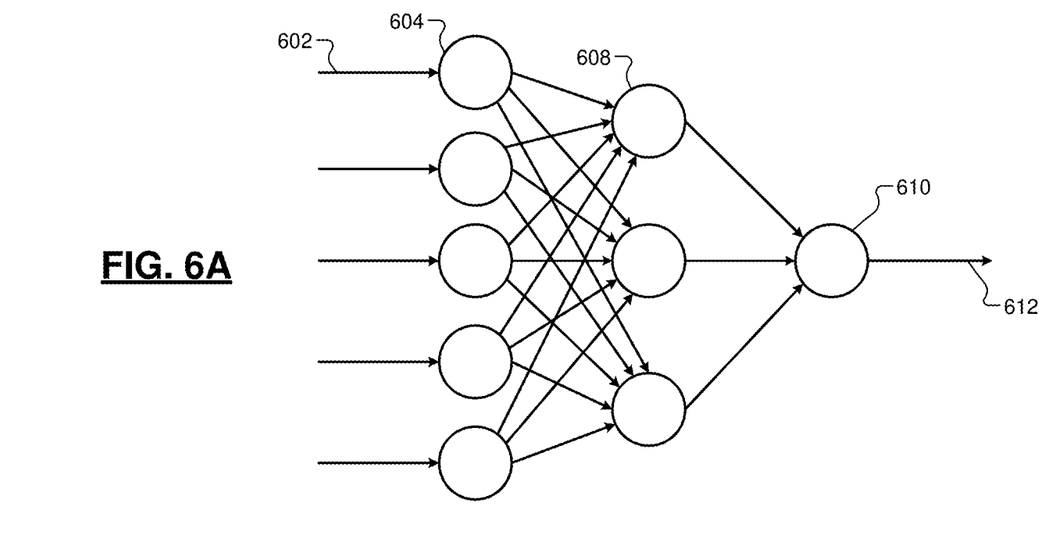
FIGS. 6A and 6B are graphical representations of example multilayer neural networks with non-linear H-infinity robustness.
Figure 6B:
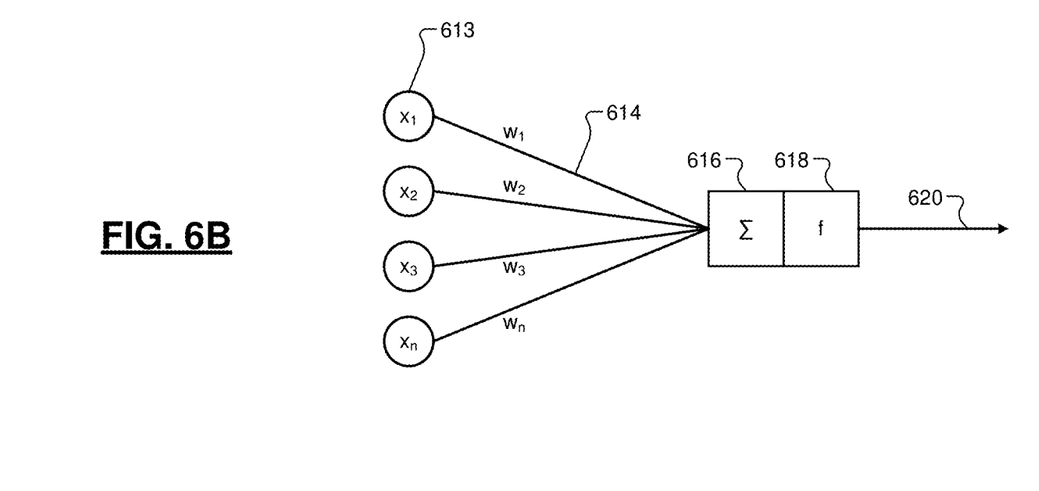

FIGS. 6A and 6B show an example of a multilayer feedforward neural network used to generate models such as those described above, using machine learning techniques. Machine learning is a method used to devise complex models and algorithms that lend themselves to prediction. The models generated using machine learning, such as those described above, can produce reliable, repeatable decisions and results, and uncover hidden insights through learning from historical relationships and trends in the data.

The purpose of using the neural-network-based model, and training the model using machine learning as described above, may be to directly predict dependent variables without casting relationships between the variables into mathematical form. The neural network model includes a large number of virtual neurons operating in parallel and arranged in layers. The first layer is the input layer 604 and receives raw input data 602. Each successive layer 608 modifies outputs from a preceding layer and sends them to a next layer. The last layer is the output layer 610 and produces output 612 of the system.

FIG. 6A shows a fully connected neural network, where each neuron in a given layer is connected to each neuron in a next layer. In the input layer, each input node is associated with a numerical value, which can be any real number. In each layer, each connection that departs from an input node has a weight 614 associated with it, which can also be any real number (see FIG. 6B). In the input layer, the number of neurons equals number of features (columns) in a dataset. The output layer may have multiple continuous outputs. For example, as shown in FIG. 6B, the inputs 613 may be processed via a sum 616 and an activation function 618, to produce an output 620.

The layers between the input and output layers are hidden layers. The number of hidden layers can be one or more (one hidden layer may be sufficient for most applications). A neural network with no hidden layers can represent linear separable functions or decisions. A neural network with one hidden layer can perform continuous mapping from one finite space to another. A neural network with two hidden layers can approximate any smooth mapping to any accuracy.

The number of neurons can be optimized. At the beginning of training, a network configuration is more likely to have excess nodes. Some of the nodes may be removed from the network during training that would not noticeably affect network performance. For example, nodes with weights approaching zero after training can be removed (this process is called pruning). The number of neurons can cause underfitting (inability to adequately capture signals in dataset) or over-fitting (insufficient information to train all neurons; network performs well on training dataset but not on test dataset).

Various methods and criteria can be used to measure performance of a neural network model. For example, root mean squared error (RMSE) measures the average distance between observed values and model predictions. Coefficient of Determination (R2) measures correlation (not accuracy) between observed and predicted outcomes. This method may not be reliable if the data has a large variance. Other performance measures include irreducible noise, model bias, and model variance. A high model bias for a model indicates that the model is not able to capture true relationship between predictors and the outcome. Model variance may indicate whether a model is stable (a slight perturbation in the data will significantly change the model fit). The neural network can receive inputs, e.g., vectors, which can be used to generate models that can be used with non-linear H-infinity robustness guarantees, as described herein.

Figure 7:
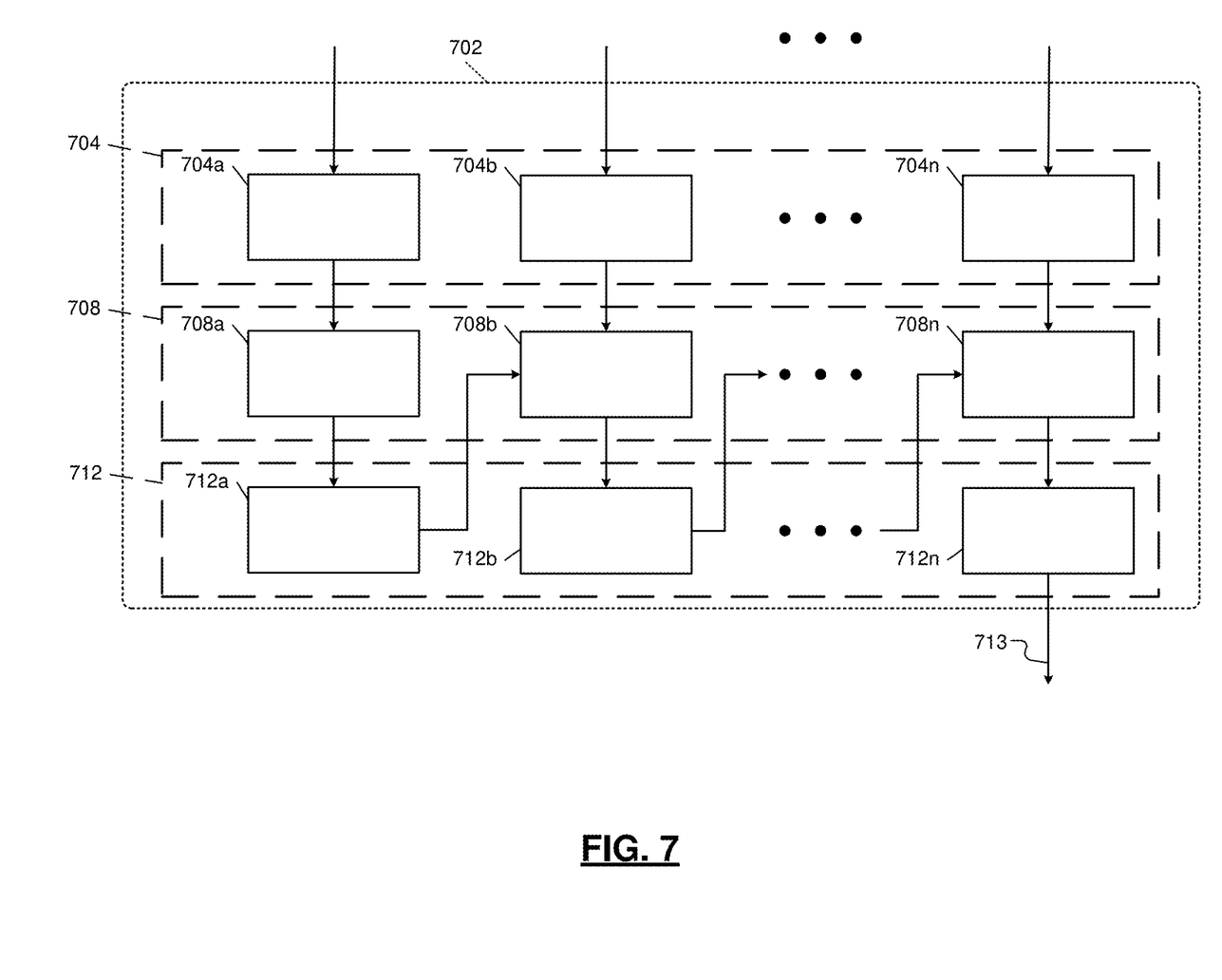
FIG. 7 is a graphical representation of layers of an example recurrent network architecture.

FIG. 7 illustrates an example of a general recurrent network architecture 702, such as a long short-term memory (LSTM) neural network, used to generate models such as those described above, using machine learning techniques, although other example embodiments may include other types of machine learning models including transformer layers, other model topologies, etc. The generic example recurrent network architecture 702 may be used to implement a machine learning model, and various implementations may use other types of machine learning networks (such as transformer layers, other model topologies or architectures, etc.). The recurrent network architecture 702 includes an input layer 704, a hidden layer 708, and an output layer 712. The input layer 704 includes inputs 704a, 704*b* . . . 704*n*. The hidden layer 708 includes neurons 708*a*, 708*b* . . . 708*n*. The output layer 712 includes outputs 712*a*, 712*b* . . . 712*n*.

Each neuron of the hidden layer 708 receives an input from the input layer 704 and outputs a value to the corresponding output in the output layer 712. For example, the neuron 708*a* receives an input from the input 704*a* and outputs a value to the output 712*a*. Each neuron, other than the neuron 708*a*, also receives an output of a previous neuron as an input. For example, the neuron 708*b* receives inputs from the input 704*b* and the output 712*a*. In this way the output of each neuron is fed forward to the next neuron in the hidden layer 708. The last output 712*n* in the output layer 712 outputs a probability 713 associated with the inputs 704*a*-704*n*. Although the input layer 704, the hidden layer 708, and the output layer 712 are depicted as each including three elements, each layer may contain any number of elements.

In various implementations, each layer of the recurrent network architecture 702 must include the same number of elements as each of the other layers of the recurrent network architecture 702. In some example embodiments, a convolutional neural network may be implemented. Similar to LSTM neural networks, convolutional neural networks include an input layer, a hidden layer, and an output layer. However, in a convolutional neural network, the output layer includes one fewer output than the number of neurons in the hidden layer and each neuron is connected to each output. Additionally, each input in the input layer is connected to each neuron in the hidden layer. In other words, input 904*a* is connected to each of neurons 708*a*, 708*b* . . . 708*n*.

In various implementations, each input node in the input layer may be associated with a numerical value, which can be any real number. In each layer, each connection that departs from an input node has a weight associated with it, which can also be any real number. In the input layer, the number of neurons equals number of features (columns) in a dataset. The output layer may have multiple continuous outputs.

As mentioned above, the layers between the input and output layers are hidden layers. The number of hidden layers can be one or more (one hidden layer may be sufficient for many applications). A neural network with no hidden layers can represent linear separable functions or decisions. A neural network with one hidden layer can perform continuous mapping from one finite space to another. A neural network with two hidden layers can approximate any smooth mapping to any accuracy. The neural network of FIG. 7 can receive inputs, e.g., vectors, which can be used to generate models that can be used with non-linear H-infinity robustness guarantees, as described herein.

Figure 8:
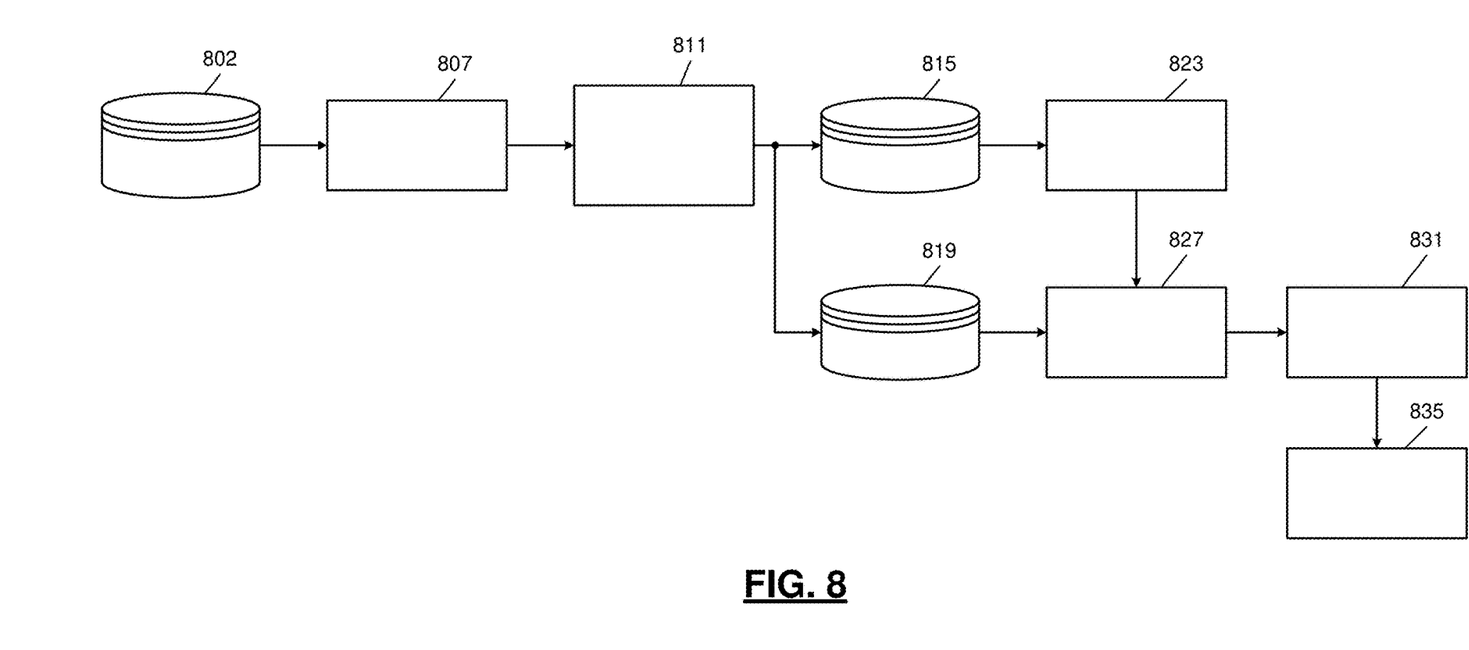
FIG. 8 is a flowchart illustrating an example process for training a machine learning model using supervised learning, and reinforcement learning may be used in some examples.

FIG. 8 illustrates an example process for generating a machine learning model using supervised learning. Reinforcement learning may be used in some example implementations. At 807, the process obtains data from a database 802 (e.g., a data warehouse). The data may include any suitable data for developing machine learning models.

At 811, the process separates the data obtained from the database 802 into training data 815 and test data 819. The training data 815 is used to train the model at 823, and the test data 819 is used to test the model at 827. Typically, the set of training data 815 is selected to be larger than the set of test data 819, depending on the desired model development parameters. For example, the training data 815 may include about seventy percent of the data acquired from the database 802, about eighty percent of the data, about ninety percent, etc. The remaining thirty percent, twenty percent, or ten percent, is then used as the test data 819.

Separating a portion of the acquired data as test data 819 allows for testing of the trained model against actual output data, to facilitate more accurate training and development of the model at 823 and 827. The model may be trained at 823 using any suitable machine learning model techniques, including those described herein, such as random forest, generalized linear models, decision tree, and neural networks.

At 831, the process evaluates the model test results. For example, the trained model may be tested at 827 using the test data 819, and the results of the output data from the tested model may be compared to actual outputs of the test data 819, to determine a level of accuracy. The model results may be evaluated using any suitable machine learning model analysis, such as the example techniques described further below.

After evaluating the model test results at 831, the model may be deployed at 835 if the model test results are satisfactory. Deploying the model may include using the model to make predictions for a large-scale input dataset with unknown outputs. If the evaluation of the model test results at 831 is unsatisfactory, the model may be developed further using different parameters, using different modeling techniques, using other model types, etc. The machine learning model method of FIG. 8 can receive inputs, e.g., vectors, which can be used to generate models that can be used with non-linear H-infinity robustness guarantees, as described herein.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method of generating a neural network control policy for a vehicle, the method comprising:
   obtaining a performance objective parameter associated with a control system of a vehicle;
   obtaining a policy optimizing algorithm corresponding to the performance objective parameter;
   defining a system state space, a control action space, and a disturbance space, each associated with the control system;
   generating a neural network control policy, based on the system state space, the control action space, and the disturbance space, wherein the neural network control policy has a non-linear H-infinity robustness guarantee; and
   automatically controlling at least one vehicle component according to the neural network control policy.

2. The method of claim 1, wherein the at least one vehicle component includes a steering mechanism, an accelerator, a braking mechanism, a drive unit or a vehicle battery charging system.

3. The method of claim 2, wherein automatically controlling the at least one vehicle component includes controlling a steering angle of the vehicle, controlling an acceleration of the vehicle, controlling braking of the vehicle, controlling power output by the drive unit, or controlling charging of a vehicle battery.

4. The method of claim 1, wherein generating the neural network control policy includes modeling nonlinear dynamics of the system state space, the control action space, and the disturbance space, using one or more polynomial equations.

5. The method of claim 4, further comprising:
executing an implementation of the control system of the vehicle or a simulation of the control system of the vehicle; and
generating the one or more polynomial equations based on data gathered during execution of the control system or a simulation of the control system, wherein the data is indicative of nonlinear dynamics of the control system.

6. The method of claim 4, wherein generating the neural network control policy includes solving a Hamilton Jacobi Inequality according to the one or more polynomial equations.

7. The method of claim 6, wherein solving the Hamilton Jacobi inequality includes solving a state dependent linear matrix inequality (SDLMI) using a sum-of-squares solver.

8. The method of claim 1, further comprising projecting an output of a neural network of the neural network control policy onto a defined set of allowable robust actions.

9. The method of claim 8, further comprising constructing the set of allowable robust actions by adding differential layers to the neural network, to augment the neural network.

10. The method of claim 1, further comprising training the neural network control policy using a policy optimizing algorithm.

11. The method of claim 10, wherein the policy optimizing algorithm includes at least one of reinforcement learning or model-based planning.

12. The method of claim 10, wherein the policy optimizing algorithm includes at least one of proximal policy optimization (PPO), a deep deterministic policy gradient (DDPG), a twin delayed deep deterministic policy gradient (TD3), or a soft actor-critic (SAC).

13. The method of claim 1, wherein generating the neural network control policy includes:
generating a first candidate neural network control policy using a first value for a tunable robustness parameter;
generating a second candidate neural network policy using a second value for a tunable robustness parameter, wherein the first value is different than the second value;
comparing a robustness output of the first candidate neural network control policy with a robustness output of the second candidate neural network policy; and
selecting the first candidate neural network control policy or the second candidate neural network policy according to comparing the robustness output of each candidate neural network control policy.

14. A method of generating a neural network control policy, the method comprising:
obtaining a performance objective parameter associated with a control system of a device;
obtaining a policy optimizing algorithm corresponding to the performance objective parameter;
defining a system state space, a control action space, and a disturbance space, each associated with the control system;
generating a first candidate neural network control policy based on the system state space, a control action space, and a disturbance space, using a first value for a tunable robustness parameter;
generating a second candidate neural network control policy based on the system state space, a control action space, and a disturbance space, using a second value for the tunable robustness parameter, wherein the first value is different than the second value;
comparing a robustness output of the first candidate neural network control policy with a robustness output of the second candidate neural network control policy;
selecting the first candidate neural network control policy or the second candidate neural network control policy according to comparing the robustness output of each candidate neural network control policy, wherein the selected one of the first candidate neural network policy or the second candidate neural network control policy has a non-linear H-infinity robustness guarantee; and
automatically controlling the device according to the selected one of the first candidate neural network policy or the second candidate neural network control policy.

15. The method of claim 14, wherein the device includes a steering mechanism of a vehicle, an accelerator of the vehicle, a braking mechanism of the vehicle, a drive unit of the vehicle or a vehicle battery charging system of the vehicle.

16. The method of claim 15, wherein automatically controlling the device includes controlling a steering angle of the vehicle, controlling an acceleration of the vehicle, controlling braking of the vehicle, controlling power output by the drive unit, or controlling charging of a vehicle battery.

17. The method of claim 14, wherein the device includes at least one of a power microgrid or a rotor of an aerial device.

18. A controller configured to implement a neural network control policy for a system, the controller comprising:
memory configured to store computer-executable instructions and a neural network control policy; and
at least one processor configured to:
receive an input;
provide a projection from the neural network control policy onto a robust action set, wherein the neural network control policy has a non-linear H-infinity robustness guarantee; and
automatically control a component associated with the system according to the neural network control policy and the robust action set, wherein the system includes at least one of a vehicle control system, an aerial device control system, and a power grid control system.

19. The controller of claim 18, wherein the neural network control policy is generated by solving a state dependent linear matrix inequality (SDLMI) using a sum-of-squares solver.

20. The controller of claim 18, wherein the neural network control policy includes a set of tuned neural-network weights, based on training the neural network control policy according to a performance objective parameter associated with a control system, and a policy optimizing algorithm corresponding to the performance objective parameter.

* * * * *